> United States Patent Office 3,455,286
Patented July 15, 1969

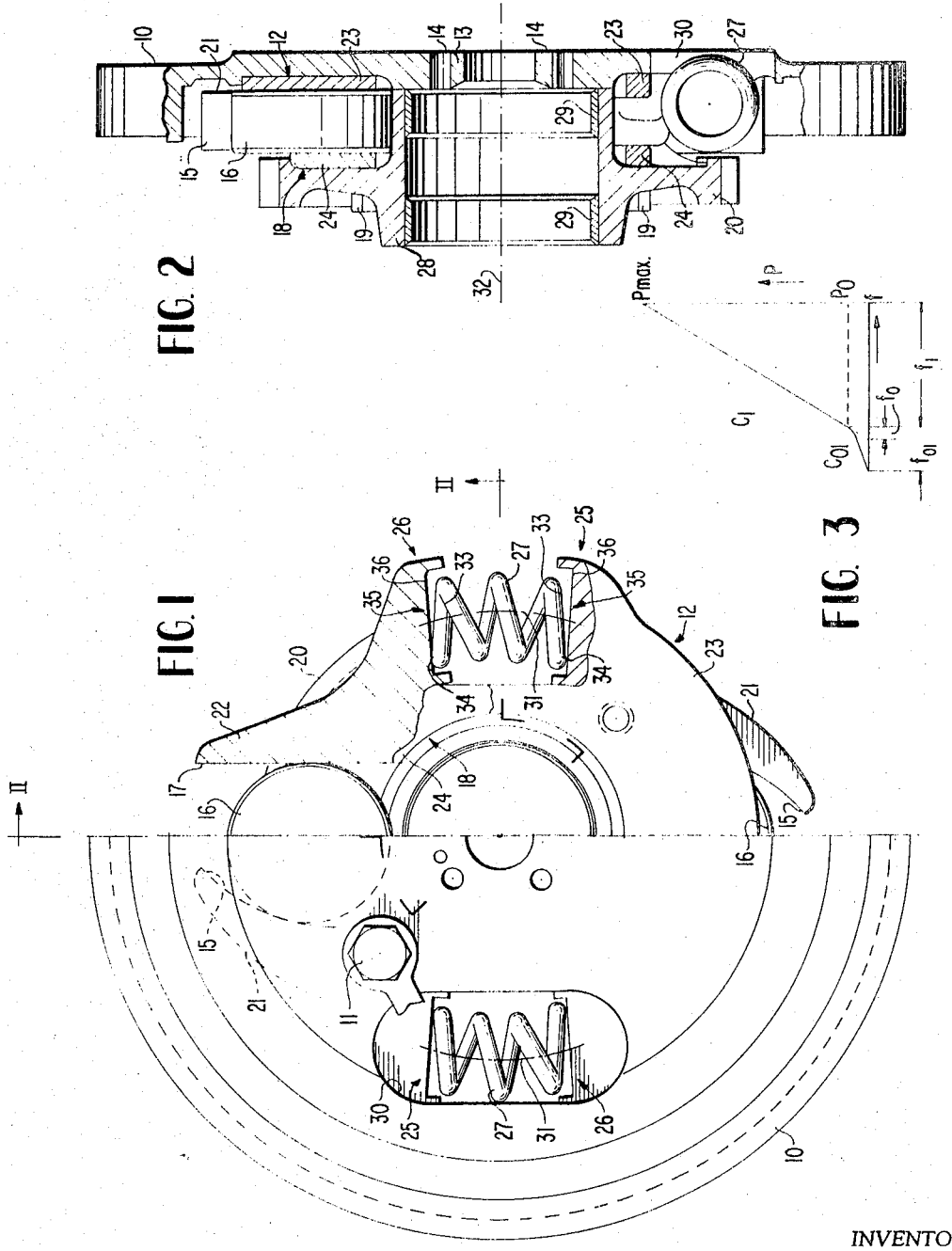

3,455,286
INSTALLATION FOR CONTROLLING THE BEGINNING OF AN INJECTION IN AN INJECTION-TYPE INTERNAL COMBUSTION ENGINE
Josef Reisacher, Fellbach, Wurttemberg, and Reiner Dziggel, Esslingen-Weil, Germany, assignors to Daimler-Benz Aktiengesellschaft, Stuttgart-Unterturkheim, Germany
Filed July 14, 1967, Ser. No. 653,550
Claims priority, application Germany, July 15, 1966, D 50,583
Int. Cl. F02m 59/20; F16d 5/00
U.S. Cl. 123—139                                 16 Claims

ABSTRACT OF THE DISCLOSURE

An installation for the control of the beginning of the injection in injection-type internal combustion engines in which an input gear is driven by the crankshaft, an output gear drives the injection pump, and an intermediate gear is in meshing engagement with either the input gear or the output gear at a constant speed ratio and is adapted to carry out limited relative rotary movements with respect to the other gear due to the control effect of flyweight bodies whose movements are counteracted by elastic bodies, in particular coil springs; the flyweight bodies as well as the elastic bodies are thereby so interposed between the two relatively movable gears as to permit the limited relative movement, and the elastic bodies, in particular in the form of coil springs, are so arranged with respect to the bearing surfaces provided on the two relatively movable gears that at least when the intermediate gear is nonrotating, the axis of the elastic body is curved due to an eccentric engagement of the forces at the elastic body.

Background of the invention

The present invention relates to an installation for the control of the injection beginning in an injection-type internal combustion engine having an input gear wheel on the engine side, an output gear wheel on the injection pump side and an intermediate gear wheel which is in meshing engagement at a constant rotational speed ratio with either the input or output gear wheel but, in contradistinction thereto, is arranged coaxially to the other gear wheel and is able to carry out a relative rotational movement limited by flyweight bodies, and in which coil springs or similarly effective elastic bodies are provided acting opposite the last-mentioned relative rotational movement, of which each elastic body engages, on the one hand, against a fixed bearing part of the intermediate wheel and, on the other, against a fixed counter-abutment of the coaxial input or output gear wheel rotatable relative to the intermediate gear wheel by means of the flyweight bodies and which is under a predetermined, preselected prestress when the intermediate gear wheel is non-rotating.

With modern internal combustion engines of compact construction, such installations cannot require a large amount of space. This prerequisite requires small wheels in diameter for the engagement of the flyweight bodies. However, with small wheels diameters, the cross-sectional dimensions of the elastic means counter-acting the flyweight bodies become relatively large.

For purposes of producing the prestress at the elastic means, only very small spring strokes are necessary by reason of the large cross-sectional dimensions. The latter require extremely high finishing tolerances in the manufacture of the individual elastic bodies and the bearing parts thereof.

Summary of the invention

The purpose of the present invention essentially resides in overcoming the aforementioned difficulties with the creation of an installation of the aforementioned type requiring little space.

In solution to the underlying problems outlined above, the present invention proposes that at least one elastic body is curved in its axis perpendicular to the cross section and corresponding to the longitudinal center axis of a coil spring at least with a nonrotating intermediate gear wheel by an eccentric force engagement relative to the axis perpendicular to the cross section by one or both of its bearing parts.

The general concept underlies these measures proposed by the present invention to create a larger spring path for the production of the prestress at the elastic bodies by changing the spring constant, without changing the spring characteristic, properly speaking, required for the cooperation with the flyweight bodies. The larger spring stroke or deflection makes it possible to permit larger tolerances for the manufacture of the elastic means and in particular of the bearing parts thereof.

By means of the curved arrangement of the elastic bodies provided according to the present invention, the advantage is achieved above all that the spring force progressively increases initially from a relatively low value up to the value corresponding to the preselected prestress.

For an installation intended for the control of the injection beginning of the type with which the present invention is concerned, in which the elastic bodies are arranged along a circle about the common central axis of the flyweight bodies, it is proposed according to a further feature of the present invention that at least with a nonrotating intermediate gear wheel, at least one of the bearing parts engages at a radially inner end portion of its elastic body with respect to the central axis. It is achieved thereby that the elastic body is curved radially outwardly in relation to the central axis.

According to a further feature of the present invention, at least one surface portion located radially outwardly in relation to the central axis at one or both of the bearing parts may come into engagement with the elastic body by the relative movement of the bearing parts of an elastic body. It is achieved by this measure that the spring force of the elastic body increases progessively only within the range of the spring path necessary for the production of the prestress but increases, in contrast thereto, linearly during flyweight movements of the flyweight bodies.

In one advantageous construction of the installation according to the present invention, the essentially flat bearing surface at one or both of the bearing parts of an elastic body may subtend with the adjacent end surface thereof an acute angle at least with a nonrotating intermediate gear wheel.

Accordingly, it is an object of the present invention to provide an installation for the control of the injection beginning in injection-type internal combustion engines which effectively eliminates the aforementioned drawbacks and shortcomings encountered with the prior art constructions.

It is another object of the present invention to provide an installation for the control of the injection beginning in injection-type internal combustion engines which does not require a large amount of space yet obviates the need for extremely high finishing tolerances in the manufacture of the individual elastic bodies and bearing parts thereof.

A further object of the present invention resides in an installation for the control of the injection beginning in injection-type internal combustion engines in which the production of the prestress in the elastic bodies is realized by a relatively larger spring path without changing its spring characteristic, properly speaking, which is necessary for the cooperation with the flyweight bodies.

Still a further object of the present invention resides in an installation of the type described above in which the spring force of the elastic bodies counteracting the flyweight effect of the flyweight bodies increases progressively from an initially relatively low value up to a value corresponding to the preselected prestress.

Still another object of the present invention resides in an installation for controlling the injection beginning in internal combustion engines of the injection type which permits simplification of the installation and reduction of the manufacturing costs thereof.

These and other objects, features, and advantages of the present invention will become more obvious from the following description when taken in connection with the accompanying drawing which shows, for purposes of illustration only, one embodiment in accordance with the present invention, and wherein:

FIGURE 1 is an elevational view of an installation for controlling the injection beginning with injection-type internal combustion engines according to the present invention in which one-half of the input gear wheel which is relatively larger in diameter, has been omitted for sake of clarity;

FIGURE 2 is a cross-sectional view through the installation taken along line II—II of FIGURE 1; and FIGURE 3 is a diagram for a spring characteristic of the coil springs counteracting the flyweight bodies in the installation according to FIGURES 1 and 2.

Referring now to the drawing wherein like reference numerals are used throughout the various views, reference numeral 10 designates therein the input gear wheel which by its operative connection with the crankshaft of an internal combustion engine (not shown) constitutes the driving gear wheel. The input gear wheel 10 is rigidly secured by means of bolts 11 with a primary segment plate generally designated by reference numeral 12. The input gear wheel 10 is provided with a radially inner flange 13 having flange apertures 14 for the fastening at the camshaft of the internal combustion engine. The primary segment plate 12 is provided with two guide means 15 for one roller-shaped flyweight body 16 each.

The flyweight bodies 16 abut in the circumferential direction of the input gear wheel 10 at a guide means 15 and at a further guide means 17. The guide means 17 are accommodated in a secondary segment plate generally designated by reference numeral 18 which, in its turn, is rigidly secured by means of bolts 19 at an intermediate gear wheel 20. The guidances 15 and 17 form the engaging surfaces at segment-like guide pieces 21 and 22, respectively, which are rigidly connected with the associated segment plates 12 and 18 and which project in a claw-like manner with respect to the plate parts 23 and 24 thereof axially in the direction of the flyweight bodies 16.

The guide pieces 21 and 22 are each constructed in the circumferential direction on the side opposite the associated flyweight body 16 as bearing part generally designated by reference numeral 25 and counter bearing part generally designated by reference numeral 26 for the engagement of a corresponding coil spring 27.

The intermediate gear wheel 20 which is rotatable by a limited amount relative to the input gear wheel 10 is provided for purposes of the rotatable bearing support on the cam shaft (not illustrated) with a radially inner bushing-shaped bearing part 28 into which are inserted two bearing bushes 29.

The intermediate gear wheel 20 may engage with an output gear wheel (not shown) which in turn may then constitute the driving gear wheel for the injection pump.

Window apertures 30 are accommodated in the input gear wheel 10 for the accommodation of the coil springs 27 of relatively large diametric dimensions; the coil springs 27 engage in the window apertures 30 on all sides with a play enabling the relative rotation between the gear wheels 10 and 20.

The coil springs 27 are arranged on a circle about the central axis 32 of the flyweight body 16 and are inserted under a preselected prestress into the bearing parts 25 and 26.

In the illustrated, radially inner starting position of the flyweights 16 with a non-rotating intermediate gear wheel 20, only one surface portion of each of the bearing parts 25 and 26, which is located radially inwardly to the central axis 32 and is indicated by reference numeral 34, engages at the adjacent end surface 33 of the coil springs 27 on the side of the bearing.

As a result thereof, the center longitudinal axes 31 of the coil springs 27 are curved relative to the central axis 32. The plane or flat bearing surfaces generally designated by reference numeral 35 of the bearing parts 25 and 26 which are located adjacent a respective end surface 33 on the spring side, extend parallel to the central axis 32 and are inclined with respect to the adjacent surface 33 under an acute angle. The arrangement of the respective adjacent surfaces 33 and 35 is thereby so made that at first, as a result of a relative rotational movement directed toward one another of the associated bearing parts 25 and 26 relative to the central axis 32, radially outwardly surface portions, indicated for example at 36, of these bearing parts 25 and 26 are brought into abutment with the corresponding surface portions of the end surfaces 33 on the spring side.

The significance of the arrangement described hereinabove of corresponding bearing surfaces at a coil spring and its bearing parts as well as of the spring curvature produced thereby is readily ascertainable from the diagram of FIGURE 3.

The spring characteristic generally designated by reference character $C_1$, i.e., the diagram of the spring force P plotted along the spring path $f_1$ and the required prestress force $P_0$ for the coil springs in the inner starting position of the flyweight bodies are given. With the known, prior art installations for the control of the injection beginning, only the very short spring path $f_0$ is then available for the production of the prestress force $P_0$. For the production of $P_0$, also very small finishing tolerances are to be maintained therefore during the manufacture of the coil springs and their bearing parts. The elasticity of the coil springs is increased within the prestress range as a result of the curvature of the coil springs so that for the production of the required prestress force $P_0$, the considerably larger springs path $f_{01}$ is available.

Within the range of the spring path $f_1$, the curvature of the coil springs 27 is again eliminated by the engagement of the surface portions 36. The progressive curve $C_{01}$ of the spring force along the spring path $f_{01}$ is thereby also substituted by a linear curve along the spring path $f_1$. The manufacture of the installation for the control of the injection commencement is simplified and rendered less expensive by this measure.

While we have shown and described one embodiment in accordance with the present invention, it is understood that the same is not limited thereto, but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. An installation for the control of the injection beginning in injection-type internal combustion engines, which comprises an input gear wheel on the engine side, an output gear wheel on the side of the injection pump and an intermediate gear wheel which is in meshing engagement at a constant rotational speed ratio with one of the two gear wheels consisting of the input and output gear wheels but is arranged coaxially to the other of said two gear wheels and is able to carry out a limited relative rotational movement with repect thereto produced by flyweight body means, and which includes elastic body means for counteracting the last-mentioned relative rotational movement, each elastic body means engaging, on the one hand, at a fixed bearing part of the intermediate gear wheel and, on the other, at a fixed counter-abutment part of said other gear wheel, and said elastic body means being under a preselected prestress with a nonrotating intermediate gear wheel, wherein the improvement comprises means for constraining at least one elastic body means such that said elastic body means, at least with a non-rotating intermediate gear wheel, has a curved axis perpendicular to the cross-sectiodn thereof and corresponding to a longitudinal center axis of a coil spring under the effect of a force engagement of at least one of its bearing parts that is eccentric to said axis perpendicular to the cross-section of said elastic body means.

2. An installation according to claim 1, wherein said elastic body means are coil springs.

3. An installation according to claim 2, wherein said elastic body means are curved under the effects of an eccentric force engagement of both of the bearing parts of each body means.

4. An installation according to claim 3, wherein the elastic body means are arranged substantially along a circle about the common central axis of the flyweight body means, at least one of the bearing parts engaging, at least with a non-rotating intermediate gear wheel, at an inner end portion of its elastic body means disposed radially inwardly to the central axis.

5. An installation according to claim 4, wherein as a result of the relative movement of the bearing parts of an elastic body means, at least an outer surface portion located radially outwardly to the central axis on at least one of the bearing parts is brought into engagement with the elastic body means.

6. An installation according to claim 5, wherein the radially outward surface portions at both of the bearing parts are brought into engagement with the elastic body means by the relative movement of the bearing parts.

7. An installation according to claim 6, wherein the bearing surface portion at a bearing part of an elastic body means is substantially flat and subtends with the adjacent end surface of the elastic body means an acute angle at least with a non-rotating intermediate gear wheel.

8. An installation according to claim 7, wherein the bearing surface portions at both bearing parts of an elastic body means subtend such acute angle.

9. An installation according to claim 1, wherein said elastic body means are curved under the effects of an eccentric force engagement of both of the bearing parts of each body means.

10. An installation according to claim 9, wherein the elastic body means are arranged substantially along a circle about the common central axis of the flyweight body means at least one of the bearing parts engaging, at least with a nonrotating intermediate gear wheel, at an inner end portion of its elastic body means disposed radially inwardly to the central axis.

11. An installation according to claim 10, wherein as a result of the relative movement of the bearing parts of an elastic body means, at least an outer surface portion located radially outwardly to the central axis on at least one of the bearing parts is brought into engagement with the elastic body means.

12. An installation according to claim 11, wherein the radially outward surface portions at both of the bearing parts are brought into engagement with the elastic body means by the relative movement of the bearing parts.

13. An installation according to claim 1, wherein the bearing surface portion at a bearing part of an elastic body means is substantially flat and subtends with the adjacent end surface of the elastic body means an acute angle at least with a nonrotating intermediate gear wheel.

14. An installation according to claim 13, wherein the bearing surface portions at both bearing parts of an elastic body means subtend such acute angle.

15. An installation according to claim 13, wherein the elastic body means are arranged substantially along a circle about the common central axis of the flyweight body means, at least one of the bearing parts engaging, at least with a nonrotating intermediate gear wheel, at an inner end portion of its elastic body means disposed radially inwardly to the central axis.

16. An installation according to claim 15, wherein as a result of the relative movement of the bearing parts of an elastic body means, at least an outer surface portion located radially outwardly to the central axis on at least one of the bearing parts is brought into engagement with the elastic body means.

References Cited
UNITED STATES PATENTS 2,829,630   4/1958   Ziesche et al. _____ 123—139

LAURENCE M. GOODRIDGE, Primary Examiner

U.S. Cl. X.R.

64—25